P. J. PULLEN.
MOLD FOR ARTIFICIAL TEETH.
APPLICATION FILED DEC. 7, 1921.

1,408,533. Patented Mar. 7, 1922.

Inventor.
Percy J. Pullen,
By
Attorney.

UNITED STATES PATENT OFFICE.

PERCY J. PULLEN, OF PHILADELPHIA, PENNSYLVANIA, ASSIGNOR TO THE DENTISTS' SUPPLY COMPANY, A CORPORATION OF NEW YORK.

MOLD FOR ARTIFICIAL TEETH.

1,408,533.  Specification of Letters Patent.  Patented Mar. 7, 1922.

Application filed December 7, 1921. Serial No. 520,472.

*To all whom it may concern:*

Be it known that I, PERCY J. PULLEN, a citizen of the United States, and resident of Philadelphia, county of Philadelphia, and State of Pennsylvania, have invented an Improvement in Molds for Artificial Teeth, of which the following is a specification.

My invention has for its object the construction of a two-part mold for molding artificial teeth and, more especially, crowns wherein the operative parts are simple, positive and rapid in action and are accurately manipulated for releasing the molded bisk teeth.

In molds for molding artificial tooth crown, means must be employed for molding the depression or holes in the root end of the crown in which the pin is to be cemented and these holes are produced by reciprocable pins which extend into the tooth space of the mold and are slidably arranged so that they may be withdrawn from the molded bisk tooth before the two-part mold is separated for releasing the same; and my improvements are specially directed to the construction of these adjustable pin structures and operative means therefor, whereby they may be moved into molding position within the tooth space or withdrawn therefrom without opening the mold, said improvements being fully described hereinafter and more particularly pointed out in the claims.

Figure 1:
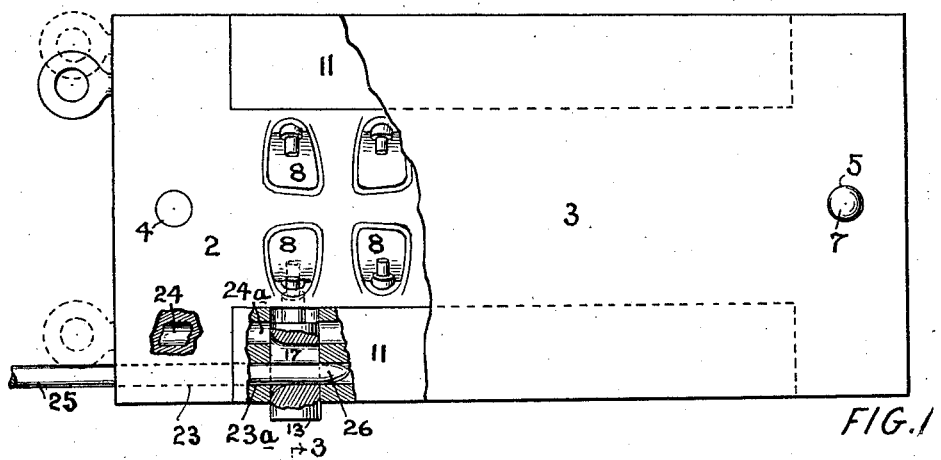
Figure 2:
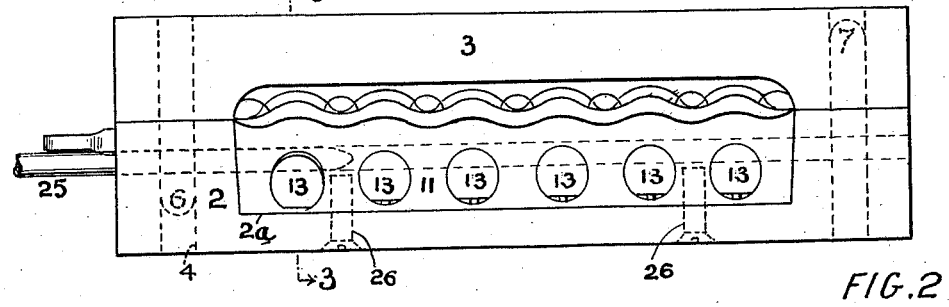
Figure 3:
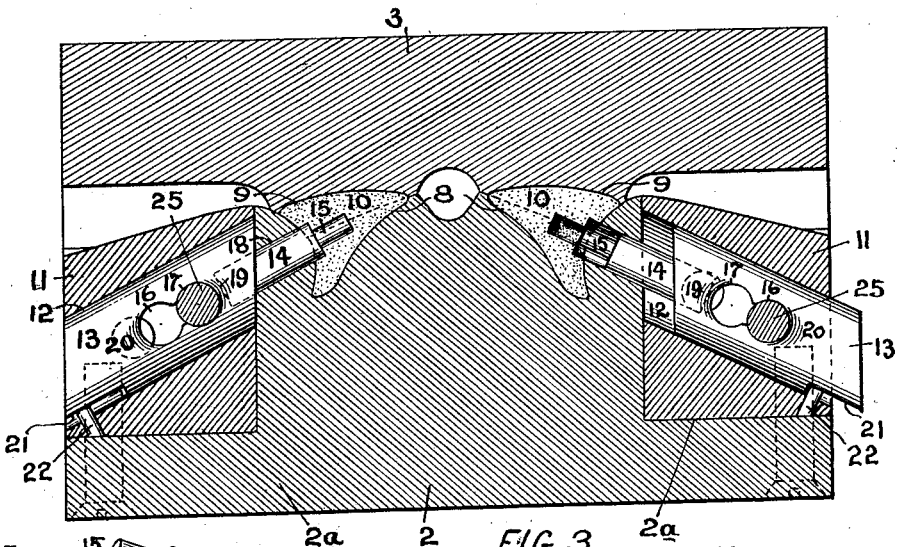
Figures 4, 5:
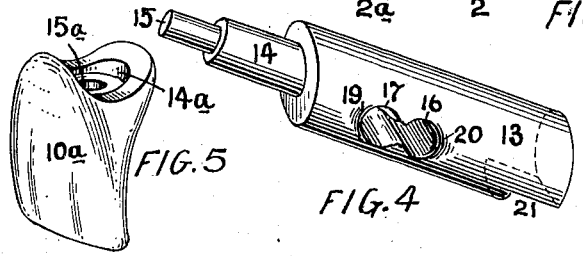

Referring to the drawings: Fig. 1 is a plan view of a two-part mold for molding artificial teeth, with a portion broken away, and embodying my improvements; Fig. 2 is a side elevation of my improved mold in completed form; Fig. 3 is a transverse sectional view of the same taken on line 3—3 of Fig. 2; Fig. 4 is a perspective view of one of the plungers and mold pins removed from the mold proper; and Fig. 5 is a perspective view of an artificial crown such as molded in my improved mold.

2 and 3 are the two parts of the mold which are detachably assembled during the molding operation and accurately positioned with respect to each other by the pin 7 on the part 2 engaging a hole 5 on the part 3, and a pin 6 on the part 3 engaging a hole 4 on the part 2. The part 3 is provided with one or more recessed portions 9 constituting the upper half of the mold spaces 10, whereas the recessed portions 8 in the lower mold part 2 constitute the remaining portions of said mold spaces 10. The mold part 2 for convenience in construction for supporting the movable plunger portions 13 is provided with longitudinal blocks 11, which portions snugly fit recesses $2^a$ and are secured in place by means of screws 26. While the mold as an entirety is provided with two rows of tooth molds in oppositely directed positions and the blocks 11 and sets of plungers 13 are duplicated, (said sets being respectively at opposite sides of the mold), it will suffice to describe the construction and mode of operation of these devices in respect to those in connection with one of the blocks 11.

The block 11 is provided with a plurality of obliquely arranged holes 12 in which are slidably mounted plungers 13, said plungers each provided, on their inner ends, with a shouldered pin 14 having the small pin projection 15 extending well up into the tooth space 10 during the molding operation. The pin 14 is guided in an oblique hole 18 in the mold body part 2 which extends obliquely upward into the tooth space 10 and obliquely downward into the space formed by the guiding hole 12 and constitutes a continuation of the plunger 13. The plungers 13 are held against rotating by pins 22 extending upwardly from the lower part of the guide holes 12 and received in flattened portions 21 on the plungers. Any other suitable manner of preventing rotation of the plungers may be employed, and I do not limit myself in this respect.

Aside from preventing the plungers rotating, these pins 22 act as stops which prevent the plungers moving outward beyond the desired extent, that is, sufficiently to withdraw the pins 14 and 15 from the mold space 10 for accurate fitting to the parallel vertical walls of the block 11 and to the vertical wall of the recess $2^a$ in the part 2, the opposite ends of the plungers 13 being finished in planes slightly oblique to the axes of the plungers and their pins, as will be clearly understood by reference to Fig. 3. Each of the plungers 13 is provided with two transverse holes 16 and 17, preferably in close relation, and in the present instance shown, this relation is such as to permit the holes to open into each other, though this is not essential. These holes receive a pin 25 which, when inserted through the hole 17, moves the plungers 13 into the position indicated at the left hand portion of Fig. 3, and when inserted into the other hole 16, causes the plunger to be moved outwardly for withdrawing the pin from the mold space, as will be understood by reference to the right hand portion of Fig. 3. The mold part 2 is provided with horizontal guide holes 23 and 24 in alinement with corresponding guide holes 23ª and 24ª in the block 11 (Fig. 1), and the distance between the centers of said holes 23ª and 24ª is greater than the distance between the centers of the holes 16 and 17 in the plungers 13 to an extent which is equal to the throw of the plungers and their pins 14 and 15. The end of the pin 25 is pointed as at 26 for more readily entering the holes 16 and 17, and to facilitate the said entrance, the opposite edges of the respective holes 16 and 17 are beveled, as at 20 and 19, to provide a cam guiding action with the point 26 of the pin 25 when the same is thrust longitudinally through the holes 23ª or 24ª, as the case may be. If it were not for the beveled portions 19 and 20 on the plungers, it would not be possible for the pointed end of the pin to pass into the holes in the plunger, once the holes were made so large that the point of the pin could find entrance into the holes without the necessity of the beveled portions. This, however, would necessitate the parts being made considerably larger than are shown and to that extent undesirable, and as the same benefits are derived from the employment of smaller holes with the particular construction illustrated, the same is preferred. The essential feature embodies in this part of the invention resides in the fact that the holes in the plungers are spaced closer together than are the guiding holes for the pin 25 in the mold part 2 and the block 11.

One of the plungers with the shouldered pin 14, 15, is clearly shown in Fig. 4, from which the general relation of all of its parts will be clearly understood. In Fig. 5, I have shown a perspective view of one of the molded teeth, the same comprising a body part 10ª, a large recess 14ª in its upper end, and a central hole or deep recess of smaller diameter 15ª extending downward into the body from the recessed portion 14ª; these parts being shaped in bisk by the shouldered pin 14, 15, as will be clearly understood by reference to Fig. 3.

As before explained, each side of the mold is provided with a similar series of plungers and are likewise associated with tooth mold spaces and an additional pin 25, but it will not be necessary to describe the same since they are identical in all respects with those already described. It will be understood that the number of the plungers employed is immaterial, as my invention comprehends the employment of one or more of such plungers, as the same are simply duplicates.

Briefly stated, the mold is operated as follows: the pins 25 are thrust through the guide holes 24 and 24ª with the result that the points enter the hole 17 in the plungers and force them upward into the position indicated at the left hand part of Fig. 3, with their pins 14, 15, projecting into the tooth space in the lower mold part 2. The bisk material is then placed in the mold part 2 surrounding and enveloping the projecting ends of the pins and, therefore, the mold part 3 is placed in position and pressed downward so that the bisk is compressed about the pins and completely fills the mold spaces. In this position, the plungers and pins are located and the parts are then subjected to a drying out or baking heat to harden the bisk. Thereafter, the pins 25 are withdrawn from the guide holes 24 and 24ª and are thrust through the guide holes 23 and 23ª, said operation causing the pins to pass through the holes 16 in the plungers with the result that they are withdrawn to the position indicated at the right hand part of Fig. 3. This operation withdraws the pins 14, 15, from the molded bisk crowns and, moreover, the plungers are held or locked in the withdrawn positions. Thereafter, the mold part 3 is lifted and the part 2 is turned over and the bisk crowns shaken out. These crowns are subsequently subjected to a vitrifying temperature which converts them into porcelain.

It will be noted that there are only two main parts to my improved mold, that is, two main parts which are disengaged. Broadly considered, the blocks 11 may be assumed to be a portion of the mold body 2, but for convenience in manufacturing, it is preferable that these blocks be made as separate pieces in association with their plungers and then secured permanently in the socket portions 2ª, as a fixed part of the mold body 2. It will be observed that when the block 11 is separated from the mold body 2, the plungers may be withdrawn from the holes 12 opposite to that where the stop pins 22 are located, so that assemblage is readily accomplished.

It will also be understood that while I have shown mold spaces 10 for molding upper incisor crowns, I do not limit myself in this respect, as the mold spaces may be shaped for molding laterals, canine, bicuspids or other teeth, as preferred, or any combinations of these. It is also to be understood that while my invention is specially intended for molding the holes in crowns to receive the anchor pins therefor, the mechanical construction of the operative parts of the plunger may be employed for operating pins in other constructions of teeth where the pin must be withdrawn from the mold space to release the molded bisk tooth before it can be removed and I, therefore, do not limit myself to the invention in respect to crown teeth. Furthermore, while I have shown the plungers and their pins operating in an oblique direction in the mold body and which is especially suited to molding crowns, as shown, I do not restrict myself to such obliquity.

While I have shown holes 16 and 17 in the plungers 13 to provide the shoulders and cam portions for cooperating with the pin 25, it will be understood that I do not limit myself to these cooperating parts being made as holes, as any suitable surface portions on the plungers, with which the pins may cooperate for moving the plungers longitudinally, may be employed in lieu of the particular preferred construction illustrated.

It will now be apparent that I have devised a novel and useful construction which embodies the features of advantage enumerated as desirable, and while I have in the present instance shown and described the preferred embodiment thereof which has been found in practice to give satisfactory and realiable results, it is to be understood that I do not restrict myself to the details, as the same are susceptible of modification in various particulars without departing from the spirit or scope of the invention.

Having now described my invention, what I claim as new and desire to secure by Letters Patent is:

1. A mold for molding artificial teeth, comprising a two-part mold each part providing a portion of the mold space, and one of the mold parts further provided with a transverse guide aperture opening into the tooth space and also having two parallel guide holes arranged transversely to the guide aperture, combined with a reciprocable plunger guided in the transverse guide aperture and having a mold pin extending into the mold space and also two transverse guide portions arranged in parallel alinement with the guide holes but closer together than are the two guide holes, and an operating pin adapted to be moved through the guide holes and transverse guide portions of the plunger, whereby the plunger is shifted in one or the other direction of its length by adjusting the operating pin through one or the other of the transverse guide holes.

2. The invention according to claim 1, wherein the operating pin is pointed to provide a cam action in its operation with respect to the plunger.

3. The invention according to claim 1, further having the two transverse guide portions of the plunger respectively provided with cam shaped surfaces oppositely directed and with which the operating pin cooperates in shifting the plunger.

4. The invention according to claim 1, wherein the two transverse guide portions of the plunger are in the form of holes respectively provided with oppositely directed cam surfaces at their entrance ends, and wherein further the operating pin has its end formed with inclined surfaces shaped to cooperate with the cam surfaces on the plunger adjacent the holes therein for shifting the plunger in one direction or the other according as the pin is adjusted through one or the other of the holes in the plunger.

5. The invention according to claim 1, wherein further the plunger supporting guide aperture is formed in a detachable block fixedly secured in a recess in the mold part and the guide holes for the pin are each formed partly in the detachable block and partly in the mold part itself through which they open at one end.

6. The invention according to claim 1, wherein the reciprocable plunger is arranged obliquely to the general horizontal plane of the mold part and is of relatively large diameter as compared with the mold pin arranged on one end for extending into the mold space, said plunger being of cylindrical cross section and having means for preventing rotations.

7. The invention according to claim 6, in which the plunger is further so formed that its transverse parallel guide portions constitute holes entirely through its body and the entrance to said holes respectively formed with oppositely directed cam shaped parts.

8. The invention according to claim 1, wherein the mold space is in the form of a tooth crown and the mold pin of the plunger enters the mold space at the portion for forming the root end of the crown, and said mold pin having a stepped construction comprising larger and smaller cylindrical portions in same axial alinement and providing at their juncture an annular shoulder which extends slightly into the mold space with the smaller pin portion wholly within the mold space when the mold is set for molding.

9. The invention according to claim 1, wherein a plurality of the respective tooth spaces and plungers are provided and arranged side by side in parallel positions, the guide holes in the mold part for the respective plungers are arranged end to end in longitudinal alinement, and the operating pin is of a length sufficiently long to actuate all of the plungers in succession.

10. The invention according to claim 9, wherein the plurality of mold spaces are integral with the body of the mold parts and the plurality of plungers are movably supported and guided in a detachable block fixedly secured in position on one of the mold parts and having the guide holes therein in longitudinal alinement with the guide holes in the mold part to which it is secured.

In testimony of which invention, I hereunto set my hand.

PERCY J. PULLEN.